UNITED STATES PATENT OFFICE.

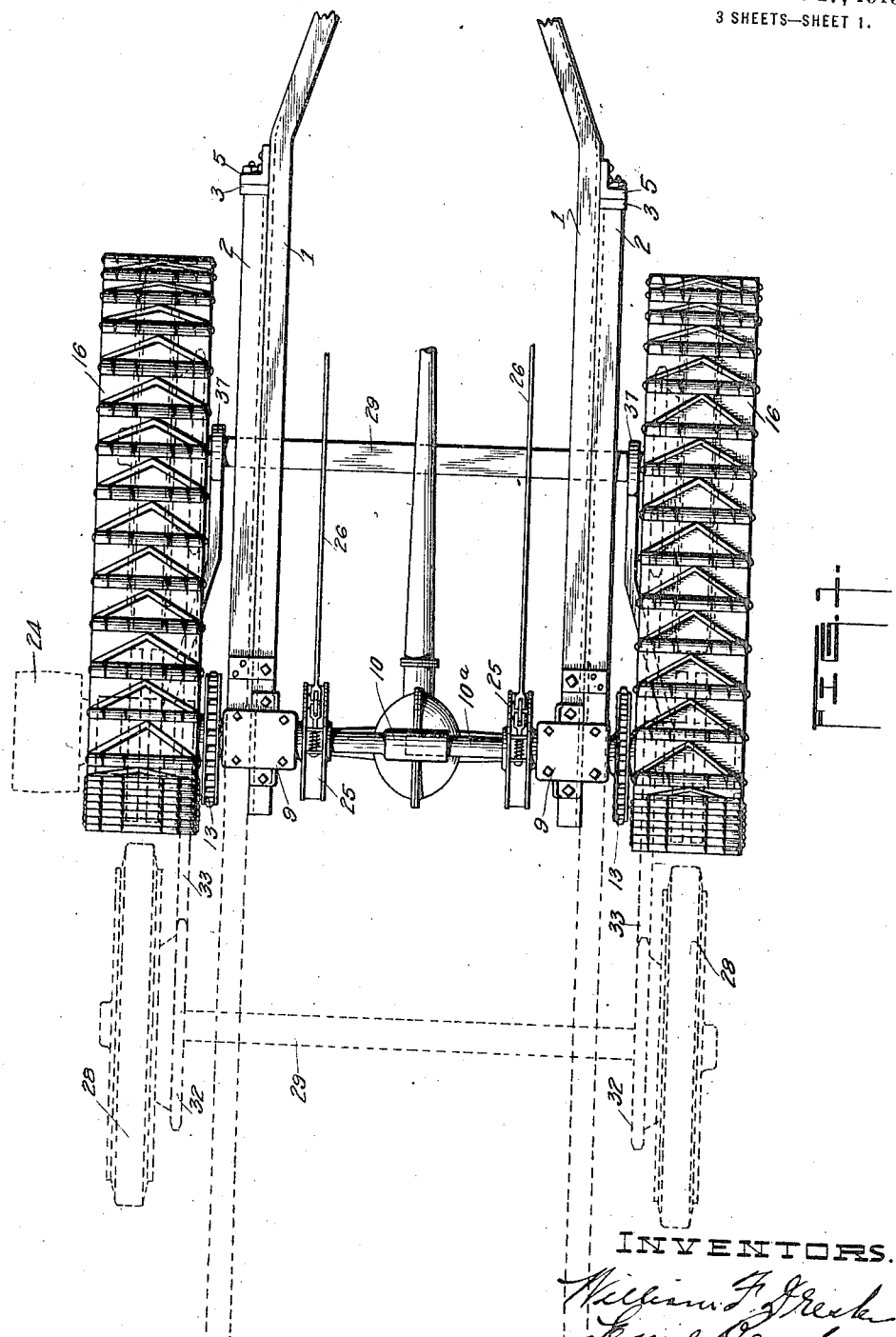

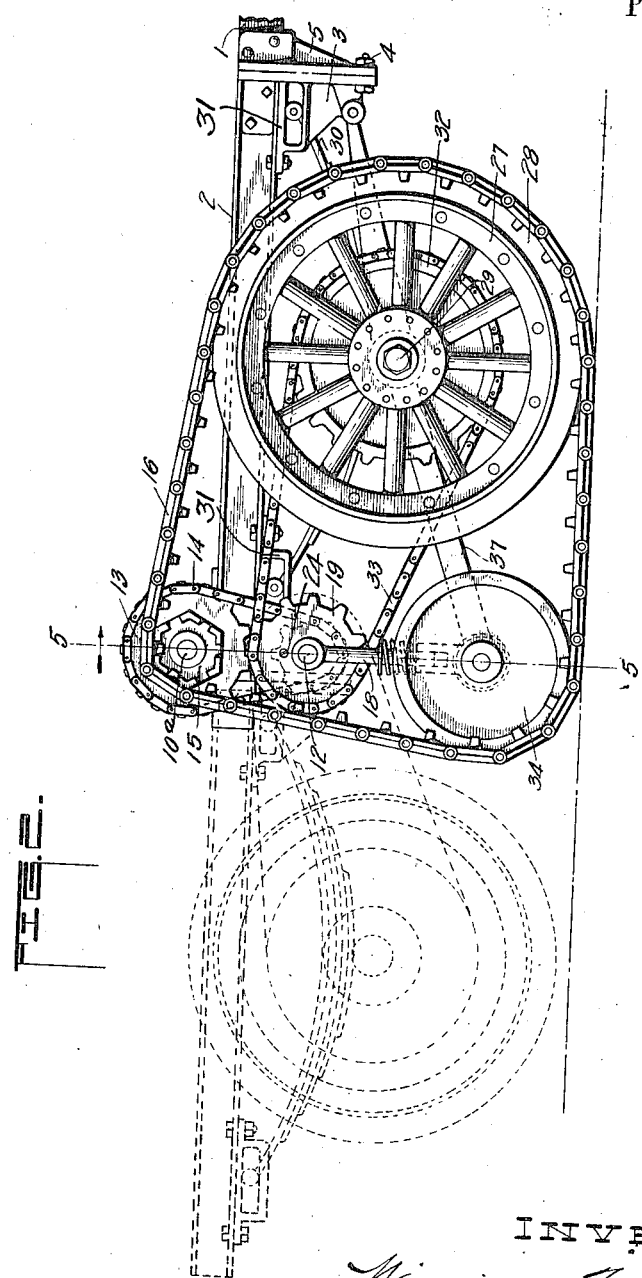

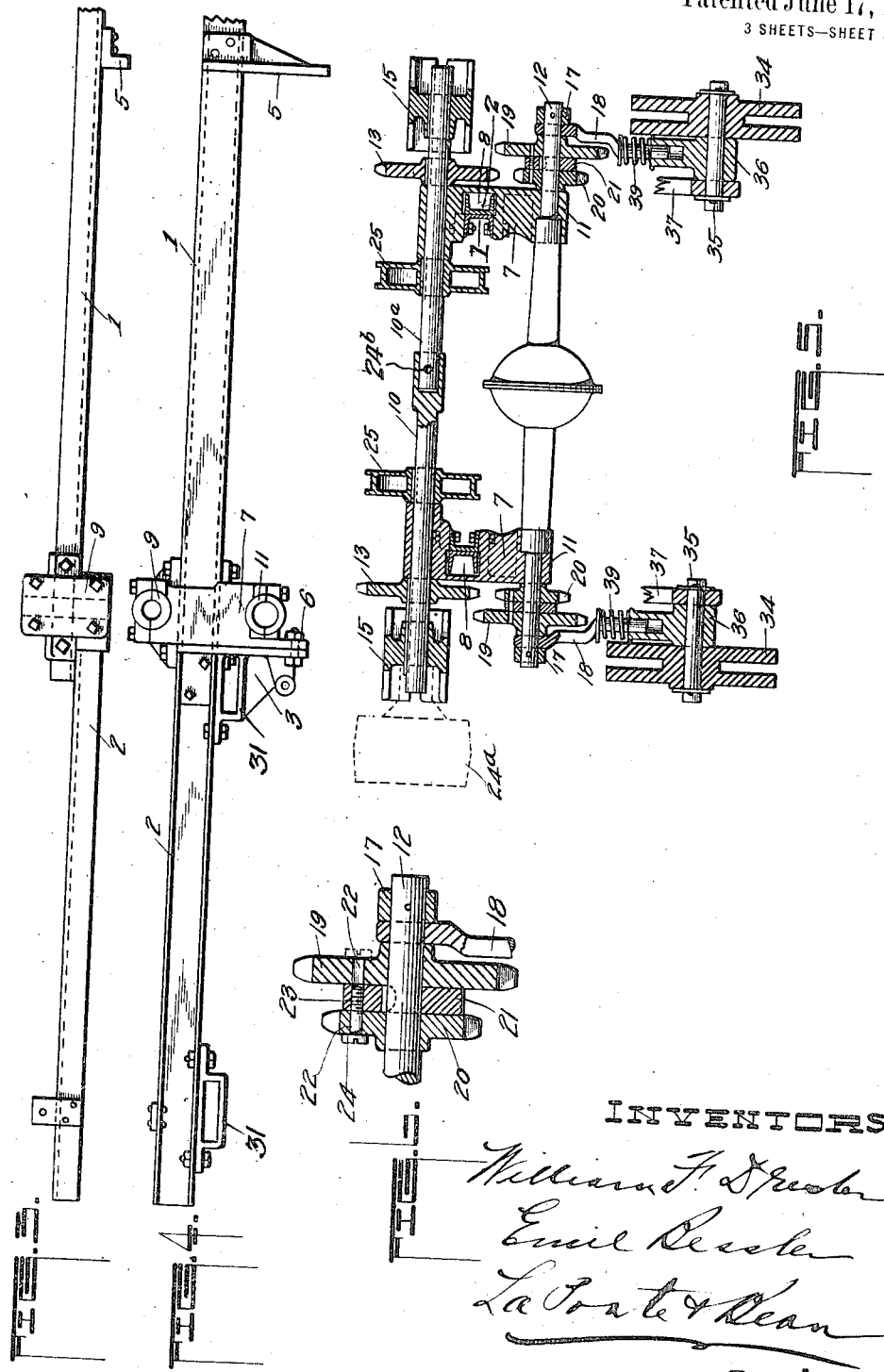

WILLIAM F. DREXLER AND EMIL BESSLER, OF MORTON, ILLINOIS.

TRACTION-VEHICLE.

1,306,884.

Specification of Letters Patent. Patented June 17, 1919.

Application filed August 13, 1917. Serial No. 185,856.

*To all whom it may concern:*

Be it known that we, WILLIAM F. DREXLER and EMIL BESSLER, citizens of the United States, residents of Morton, in the county of Tazewell and State of Illinois, have invented new and useful Improvements in Traction-Vehicles, of which the following is a specification.

This invention has reference to a traction vehicle in which is combined a traction mechanism and operating means therefor, by means of which the vehicle may be interchangeable used as a tractor, or as a truck.

The traction mechanism is preferably of that type which includes traction wheels having rubber tires which are preferably used when the vehicle is used as a truck, and a pair of broad endless-tracks, or flexible endless-belts which are laid down by the vehicle as it advances, and preferably used when the vehicle is used as a tractor, and upon which broad tracks the weight of the vehicle is supported.

One of the objects of the present invention is to provide the vehicle with frame parts capable of being extended when it is desired to use the vehicle as a truck, and retracted when it is desired to use the vehicle as a tractor, the springs or bearing supports being connected with the movable members of said frame.

The invention has for a further object to provide an operating means for the traction mechanism including changeable speed gearing, whereby, when the vehicle is used as a truck, a high speed may be obtained, and a much lower speed obtained when the vehicle is used as a tractor.

With the above and other objects in view, the invention consists of the improved traction vehicle and its parts and combinations as set forth in the claims, and all equivalents thereof.

In the accompanying drawings in which the same reference characters indicate the same parts in all of the views:

Figure 1 is a plan view of our improved vehicle, the full lines showing the same when used as a tractor, and the dotted lines showing the frame extended for use as a truck:

Fig. 2 is a side elevation of Fig. 1;

Fig. 3 is a plan view of the members constituting one side of the vehicle frame, the parts extended for use as a truck;

Fig. 4 is a side elevation of Fig. 3;

Fig. 5 is a vertical transverse sectional view as the same would appear if taken on the line 5—5 of Fig. 2, and Fig. 6 is a detail sectional view of certain gearing on the driving shaft.

The side frames of the vehicle comprise the rails 1 and 2, preferably channel beams with their smooth vertical faces disposed back to back whereby, the rails 2 may slide easily on and longitudinally of the rails 1. When the rails 2 are retracted, as in Figs. 1 and 2, the vehicle is intended for use as a tractor, and when extended as in Figs. 3 and 4, the vehicle is intended for use as a truck. To the inner ends of the rails 2 are detachably secured the depending brackets 3 which are adapted to be bolted, by bolts 4, to similar brackets 5 secured to the rails 1, when the rails 2 are retracted and bolted by bolts 6, to brackets 7 secured to the rear ends of the rails 1, when the rails 2 are extended.

The brackets 7 overhang the rails 1 and have depending body portions in which are openings 8 through which the rails 2 may slide. The upper end portions of the brackets 7 have bearings 9 in which are journaled the axially alined transversely disposed counter-shaft sections 10 and 10ª, the meeting ends of which are coupled so as to operate in unison or independently of each other, see Fig. 5. The lower end portions of the brackets 7 having bearings in which are journaled the opposite ends of a driving shaft 12, adapted to receive its power from a gasolene motor, not shown, or from any other suitable source.

Keyed or otherwise suitably connected with the outer ends of the counter shaft sections 10 and 10ª are sprocket wheels 13 of the usual type for receiving the ordinary and well known endless chains 14, and other sprocket wheels 15, of a type to receive the broad endless-tracks or flexible endless belts 16 which are designed to be laid down by the vehicle as it advances, and upon which broad tracks the weight of the vehicle is supported.

Secured to the ends of the shaft 12 and spaced a suitable distance from the brackets 7 are collars 17 and hung on said shaft adjacent said collars 17 are arms 18. On said shaft 12 between the arms 18 and the brackets 7 are loosely carried the spaced sprocket wheels 19 and 20, of different diameters, and between the said sprocket wheels 19 and 20 and keyed or otherwise suitably secured to the said shaft 12 are the disks or plates 21, The bodies of the sprocket wheels 19 and 20 are each provided with alined transverse openings 22 and said openings are alined with and correspond to threaded openings 23 disposed transversely through the disks or plates 21. A threaded pin or bolt 24 is used for keying the sprocket wheel 19 with the disk or plate 21, or for keying the sprocket wheel 20 with said disk or plate 21, when applied as shown in full or dotted lines in Fig. 6. On the end of one of the counter shaft sections 10 or 10ª may be attached the pulley wheel 24ª, see Fig. 5, if desired. To each of the shaft sections 10 and 10ª, are connected the friction brake drums 25, of any well known construction, the same being controlled in the usual manner by means of the brake rods 26, from suitable operating means, not shown.

The traction wheels 27 are of a usual construction having the rubber tires 28 and carried on the outer ends of an axle 29 which is preferably hung or suspended from springs 30, the opposite ends of which are connected with and have movement in hangers 31 secured to the front and rear ends of the rails 2, as shown. The hangers 31 for the forward ends of the springs 30 are for convenience made as a part of the brackets 3, as shown. To extend the rails 2 for the purpose of using the frame as a truck, it is necessary to remove the brackets 3 and replace them after the rails 2 have been slid through the brackets 7, see Fig. 4, as will be understood. To each traction wheel 27 is secured a large sprocket wheel 32, of a type similar to the sprocket wheels 19 and connected therewith by the ordinary and well known sprocket chains 33. The sprocket chains 14 connect the sprocket wheels 13 with the smaller sprocket wheels 20, while the broad endless-tracks or flexible belts 16 pass from the sprocket wheels 15 over and part way around the rubber tires 28 on the traction wheels 27, a suitable distance along the ground to lay a track on which the weight of the vehicle is supported, part way around idler wheels 34 and to the sprocket wheels 15. These idler wheels are journaled on short shafts 35 having a bearing in blocks 36 and also an arm 37 hung from the axle 29 on which the traction wheels are carried. Loosely inserted into the upper ends of the blocks 36 are the arms 18, and on said arms 18 between a collar 38 and the upper ends of the blocks 36, are coil springs 39, the function of which, as is well known, is to keep the endless-tracks or flexible belts 16 taut.

When the vehicle is used as a tractor the frame is shortened and appears as shown in Fig. 2. In this arrangement it is preferable to reduce the speed of the operating means, and the pins 24 are secured into the threaded openings 23 in the disks or plates 21 through the sprocket wheels 20, keying said sprocket wheels to the driving shaft 12. The power is then transmitted from the driving shaft 12 through the counter shaft sections 10 and 10ª to the sprocket wheels 15 thereon and to the broad endless-tracks or flexible endless-belts 16.

When the vehicle is used as a truck the frame is lengthened by extending the side rails 2 to the positions shown in dotted lines in Figs. 1 and 2. In this arrangement the broad endless-tracks or endless belts 16 are removed, and it is preferable to increase the speed of the operating means for the traction mechanism. This is accomplished by screwing the pins 24 into the threaded openings 23 in the disks or plates 21 through the sprocket wheels 19, keying said sprocket wheels to the driving shaft 12. The power is then transmitted direct from the shaft 12 through the sprocket wheels 19 and the chains 33 to the sprocket wheels 32.

To use the pulley wheel 24ª, the shaft sections 10 and 10ª should be pinned together, by a pin 24ᵇ, shown in dotted lines in Fig. 5, the sprockets 13 and 20 connected, and the tracks 16 removed.

When the vehicle is used as a tractor, the hitch is short, and the traction wheels and tracks being in advance of the idler wheels, little trouble will be experienced in passing over objects. Further, the operator may lock one of the brake drums 25 and permit the vehicle to turn in a very small space, as will be understood with mechanism of this character.

What we claim is:—

1. A traction-vehicle, comprising a frame including side rails adapted to be extended, whereby the vehicle may be used as a truck, and retracted, whereby the vehicle may be used as a tractor, a traction mechanism including traction wheels and broad endless-tracks, and an operating means for said traction mechanism, said operating means including changeable speed gearing adapted for giving a greater speed to the traction mechanism when the vehicle is used as a truck, than when used as a tractor.

2. A traction-vehicle, comprising a frame including side rails adapted to be extended, whereby the vehicle may be used as a truck, and retracted, whereby the vehicle may be used as a tractor, a traction mechanism including rubber tire traction wheels and broad endless-tracks passing around said wheels, an operating means including interchangeable driving parts, one of such parts adapted to drive the traction wheels direct when the vehicle is used as a truck, and the other of such parts adapted to drive the broad endless-tracks when the vehicle is used as a tractor.

3. A traction-vehicle comprising a frame, a traction mechanism including rubber tire traction wheels and broad endless-tracks passing around said wheels, a driving shaft, a counter shaft, gearing on the counter shaft for actuating said endless-tracks, gearing on the driving shaft for actuating said wheels, said gearing normally loose on said driving shaft, other gearing on said driving shaft for actuating said counter shaft, said last mentioned gearing also normally loose on said driving shaft, and means for interchangeably connecting said gearing to said driving shaft for driving the vehicle directly through the traction wheels, or through the endless-tracks.

4. A traction-vehicle, comprising a frame, a traction mechanism including rubber tire traction wheels and broad endless-tracks passing around said wheels, a driving shaft, a counter shaft, means for actuating the traction wheels direct from the driving shaft, means for actuating the endless-tracks from the counter-shaft, means for operating the counter-shaft from the driving shaft, idler wheels for guiding the endless-tracks from the traction wheels around the counter shaft, said idlers so positioned as to cause the endless-tracks to travel some distance on the ground, and means for yieldingly holding the idler wheels to their work.

5. A traction-vehicle, including a frame having side rails of two members each, one member of each of said side rails adapted to be moved alongside of and longitudinally of the other member, brackets secured to the rear ends of the immovable rail members and having overhanging depending portions through which the movable rail members slide, brackets secured to the forward ends of both the immovable and movable rail members which are adapted to be secured together when the movable rail members are retracted, said brackets on the forward ends of said movable rail members also adapted to be bolted to the brackets on the rear ends of said immovable rail members when said movable rail members have been extended.

6. A traction vehicle, comprising a frame having side rails of two members each, one member of each of said side rails adapted to be moved alongside of and longitudinally of the other member, brackets secured to the rear ends of the immovable rail members and having overhanging depending portions through which the movable rail members slide, bracket members secured to the forward and rear ends of said movable rail members, said bracket members on the forward ends of said movable rail members adapted to be secured to the bracket members on the rear ends of the immovable rail members when said movable rail members are retracted, springs connected with the brackets on said movable rail members, traction wheels connected with said springs, a driving shaft journaled on the brackets on said immovable rail members, and means for actuating the traction wheels from said driving shaft.

7. A traction-vehicle, comprising a frame, traction wheels spring connected with said frame, broad endless-tracks passing around said wheels, a driving shaft, a two-part counter shaft, friction brake drums connected with each section of said counter shaft and means for controlling same, sprocket wheels on said counter shaft sections for actuating said endless-tracks, two pairs of sprocket wheels normally loose on said driving shaft, means connecting one sprocket wheel of each pair on the driving shaft with a section of said counter shaft, means connecting the other sprocket wheel of each pair on the driving shaft with a traction wheel, means for interchangeably connecting corresponding sprocket wheels of each pair on the driving shaft therewith, and yieldingly retained idler wheels for said endless-tracks.

In witness whereof, we have hereunto affixed our hands this 3rd day of August, 1917.

WILLIAM F. DREXLER.
EMIL BESSLER.